United States Patent [19]

Calhoun et al.

[11] 4,404,779

[45] Sep. 20, 1983

[54] TRENCHDUCT CONSTRUCTION HAVING ADJUSTABLE LID-SUPPORTING MEANS

[75] Inventors: L. Owen Calhoun, Richmond Hill; Michael A. Murray, Toronto, both of Canada

[73] Assignee: CTS Corporation, Elkhart, Ind.

[21] Appl. No.: 254,880

[22] Filed: Apr. 16, 1981

[30] Foreign Application Priority Data

Apr. 10, 1981 [CA] Canada .................................. 375261

[51] Int. Cl.³ ........................ E04B 5/48; E04F 17/08; E04F 19/08
[52] U.S. Cl. ..................................... 52/126.2; 52/221
[58] Field of Search ....................... 52/221, 220, 126.2

[56] References Cited

U.S. PATENT DOCUMENTS

| | | |
|---|---|---|
| 740,663 | 10/1903 | Krantz . |
| 1,782,779 | 11/1930 | Fullman . |
| 2,601,213 | 6/1952 | Poupitch ............................. 189/36 |
| 2,870,623 | 1/1959 | Murray ................................. 72/70 |
| 2,883,228 | 4/1959 | Roberts Jr. ..................... 292/256.71 |
| 2,945,705 | 7/1960 | Murray ............................... 285/18 |
| 2,961,480 | 11/1960 | Murray ................................ 174/48 |
| 3,063,471 | 11/1962 | Murray .............................. 138/159 |
| 3,074,208 | 1/1963 | Seidel ............................. 52/262 X |
| 3,101,097 | 8/1963 | Murray ............................... 138/92 |
| 3,262,238 | 7/1966 | Fork .................................... 52/221 |
| 3,318,476 | 5/1967 | Clark .............................. 52/221 X |
| 3,420,017 | 1/1969 | Brugger et al. ....................... 52/221 |
| 3,420,018 | 1/1969 | Fork .................................... 52/221 |
| 3,435,568 | 4/1969 | Hoseason et al. .................... 52/221 |
| 3,453,791 | 7/1969 | Fork .................................... 52/221 |
| 3,494,084 | 2/1970 | Hazen ................................. 52/221 |
| 3,494,381 | 2/1970 | Fork .................................... 138/92 |
| 3,530,627 | 9/1970 | Carter et al. ......................... 52/221 |
| 3,551,584 | 12/1970 | Rose ................................... 174/49 |
| 3,593,472 | 7/1971 | Bargar et al. ........................ 52/221 |
| 3,721,051 | 3/1973 | Fork ................................... 52/173 |
| 3,724,148 | 4/1973 | Bregenzer ........................... 52/221 |
| 3,753,585 | 8/1973 | Casto ......................... 287/187.36 R |
| 3,769,445 | 10/1973 | Bregenzer ......................... 174/101 |
| 3,848,379 | 11/1974 | Hazen ................................. 52/221 |
| 3,851,674 | 12/1974 | Fork .................................. 138/173 |
| 3,886,702 | 6/1975 | Fork .................................... 52/221 |
| 3,903,666 | 9/1975 | Fork .................................... 52/221 |
| 4,040,755 | 8/1977 | Jorgensen et al. ............... 52/221 X |
| 4,041,238 | 8/1977 | Penczak .............................. 174/48 |
| 4,065,896 | 1/1978 | Penczak ............................. 52/220 |
| 4,096,347 | 6/1978 | Penczak .............................. 174/48 |
| 4,194,332 | 3/1980 | Fork .................................... 52/220 |

*Primary Examiner*—Alfred C. Perham
*Attorney, Agent, or Firm*—Larry J. Palguta; John A. Young

[57] ABSTRACT

A subfloor trenchduct (10) construction in which the side wall members (14, 16) and lid-supporting means (37) are constructed of galvanized steel in order to provide a reduced cross section for the component members and thereby maximizing the availability of internal space within the trenchduct (10) for electric service. The galvanized steel construction obviates larger cross sections previously employed in utilization of aluminum components which detracted from the effective use of internal space of the duct, and the aluminum components required protective coating since aluminum, when exposed to alkaline concrete, experiences deterioration of the components. The lid-supporting means (37) is made vertically adjustable relative to floor level so that prior to pouring of the concrete (66) the lid (30) is accurately located in relation to the floor.

6 Claims, 8 Drawing Figures

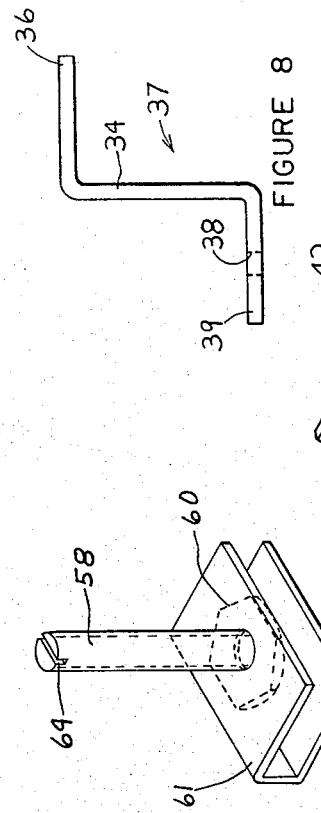
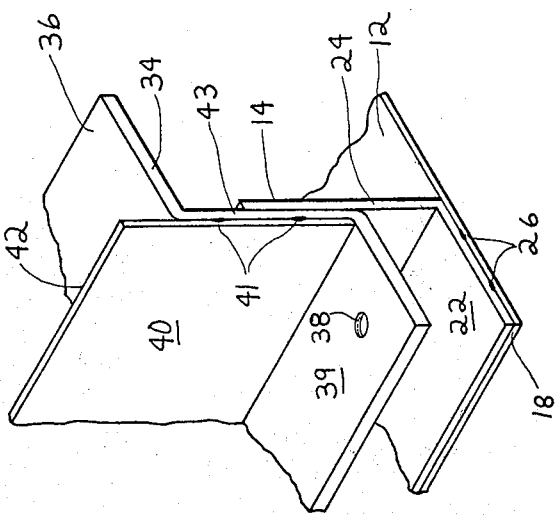
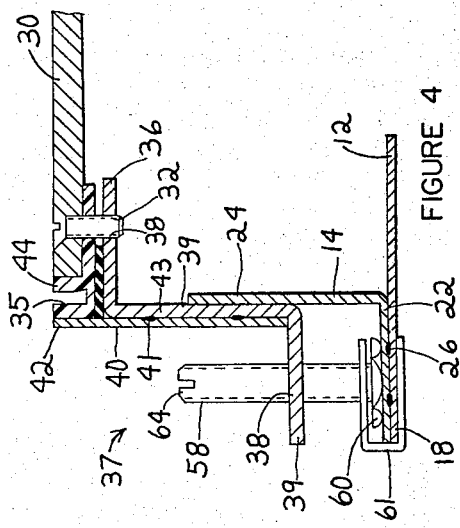
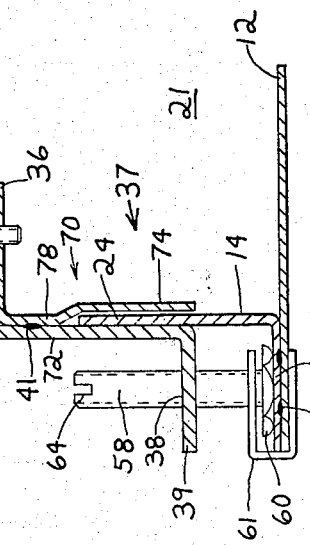

TRENCHDUCT CONSTRUCTION HAVING ADJUSTABLE LID-SUPPORTING MEANS

DESCRIPTION

1. Technical Field

The invention relates to trenchduct constructions which are located at subfloor level to provide distribution for electrical networks, thereby providing protected and hidden electrical cables, conductors and the like and which provide electrical and communications service outlets at convenient locations.

2. Background Art

The use of trenchduct designs at subfloor levels has gained considerable acceptance architecturally especially for commercial buildings, since it is possible to provide convenient locations for electrical outlets while at the same time concealing as well as protecting electrical cables and conductors.

In previous art, the trenchduct was constructed of aluminum components which were protectively covered in some suitable manner so that they would not become corroded by direct exposure to the concrete. According to its compositional nature, the concrete can range from a mildly to strongly alkaline condition, having a deteriorative effect upon aluminum. Consequently, there was added to the cost of construction, the provision of a protective coating on the aluminum to avoid the cost of replacement of aluminum parts and to protect the aluminum against the alkaline effect of the concrete.

Because trenchduct constructions extensively used cast aluminum or drawn aluminum, the inherent cost of the trenchduct has escalated remarkably.

Hoseason et al. U.S. Pat No. 3,435,568 entitled "Trenchduct Assembly with Adjustable Lid Supporting Members", issued Apr. 1, 1969 and Jorgensen et al. U.S. Pat. No. 4,040,755 entitled "Trenchduct Connector" issued Aug. 9, 1977 illustrate the typical cross sectional dimension of drawn aluminum, projecting inwardly from the outer periphery of the trenchduct and thereby reducing the available space within the trenchduct for electrical service lines. These typical trenchduct constructions require considerable manufacturing time to complete fabrication.

As an adjustment to trenchduct designs, there is utilized an adjustable lid-supporting means to raise and lower the lid so that it will be precisely at floor level, this adjustment occurring before concrete is poured around the trenchduct. It is necessary, of course, to maintain the lid at as near floor level location as possible so that there would be no floor level irregularities. The necessity for the lid, is that there must be access to the interior of the trenchduct for repair and replacement as well as further additions of electrical conductors in line networks and the like after concrete pours have occurred and the trenchduct is embedded within the concrete.

Various patents illustrative of the usage of adjustable lids which well illustrate the conventional use of aluminum are the Hoseason et al. U.S. Pat. No. 3,435,568, Carter et al. U.S. Pat. No. 3,530,627 issued Sept. 29, 1970 "Trench Header Duct System" having a somewhat related cover support system and duct, but utilizing L-shaped screeding angle pieces together with bolts and bolt slots which provide adjustment for the lid, but lacking the simplicity of construction and teaching of the present invention. Jorgensen et al. U.S. Pat. No. 4,040,755 illustrates a drawn aluminum construction, but lacking the lid-adjusting feature by which a rotatable bolt captured by the base and a portion of the side wall is cooperative with a threaded opening and the lid-supporting means to adjust the vertical position for the lid. The construction of Jorgensen et al. is capable of adjusting the trench lid, but not by means of an adjuster, a fixed threaded sleeve and a stem moveable within the sleeve.

Examples of other metal floor duct systems are illustrated by Hoseason U.S. Pat. No. 2,812,654, Stuessel et al. U.S. Pat. No. 3,204,378, and Seidel U.S. Pat. No. 3,074,208. These duct systems utilize a variety of bolt connections, brackets, outer and inner side walls, and other component parts lacking the simplicity and versatility of the present invention.

DISCLOSURE OF THE INVENTION

The present invention relates to a trenchduct design in which the base, side wall members, and lid-supporting means are all constructed of galvanized steel to obviate the necessity for protectively coated aluminum members. The lid-supporting means is vertically adjustable to the exact floor level by means of a threaded bolt captured between portions of the base and side wall member, but nevertheless permits free rotation in captured position. The adjuster bolt has a threaded stem which is received through a complementary threaded opening of the lid-supporting means and includes a tool-receiving slot to facilitate rotation of the stem thereby threadedly positioning the lid-supporting means. The adjustment for position of the lid-supporting means occurs before a concrete pour is made around the outer area of the trenchduct so that there is at finished pour, correct positioning of the lid relative to the remainder of the floor. As a result, there are no irregularities at floor level. The trenchduct, because of the relatively thinner cross section of the galvanized steel members, maximizes the internal cavity for the trenchduct "run" thereby enabling greater quantity of service cables and conductors within the run. The lid, after installation of the service lines, is fitted onto the lid-supporting means and is fastened thereto. The lid includes means for clamping the carpet or other floor covering in place relatively to the lid and lid-supporting means.

BRIEF DESCRIPTION OF THE DRAWINGS

FIG. 4 is an enlarged sectional detail view of the lid-supporting means;

FIG. 5 is a sectional detail view of another embodiment of the invention in which the lid-supporting means is constructed in a bifucated manner;

FIG. 6 is a perspective detail view of the adjusting bolt and clip which captures the head of the bolt, retaining it relatively to the base and side wall of the trenchduct;

FIG. 7 is a detail view of an enlarged fragmentary portion of the lid-supporting means and the side wall base section of the trenchduct; and, FIG. 8 is an end view of the Z-cross section portion of the lid-supporting means.

BEST MODE FOR CARRYING OUT THE INVENTION

Figure 1:
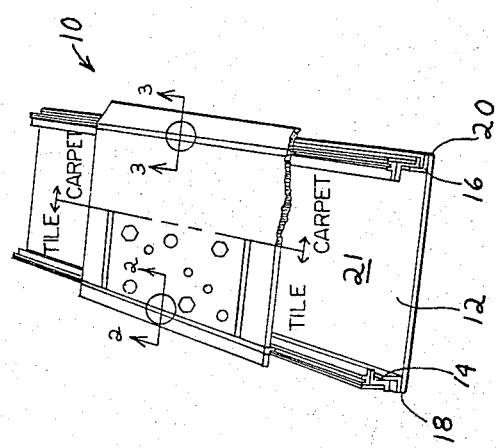
FIG. 1 is an isometric view of a portion of a trenchduct constructed in accordance with the present invention.

Referring now to the drawings, there is illustrated a portion of a trenchduct illustrated in FIG. 1 and designated generally by reference numeral 10. The trenchduct consists essentially of a base 12 and two longitudinally extending side wall sections 14, 16 disposed along opposite edges 18 and 20 of the base to define therebetween an envelope or channel 21 wherein there can be received electrical and communication service (not shown) in the form of cables, electrical conductors, and the like. The trenchduct is located at a location below the floor level and is a convenient way of distributing an electrical power and communication service layout. It should be understood that there are a number of these trenchduct sections which can be selectively interconnected to form a network of service outlets.

The described system is a popular scheme for concealing the electric distribution network, while at the same time making it readily accessible for service.

Figure 3:
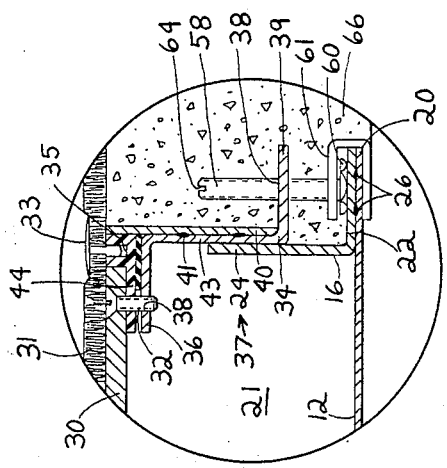
FIG. 3 is an enlarged sectional detail view taken on line 3—3 of the trenchduct design illustrated in FIG. 1 and encompassing the area illustrated by the encircled portion of FIG. 1.
Figure 2:
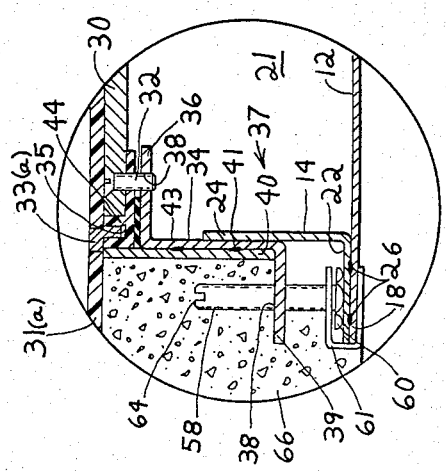
FIG. 2 is an enlarged detail sectional view taken on line 2—2 of FIG. 1 and encompassing the encircled area of FIG. 1.

The side wall sections 14 and 16 are each identically constructed and consist of a base flange 22 and upright flange 24, the base flange 22 being permanently secured to the base of the trenchduct by welding as indicated by reference numeral 26 (FIGS. 2, 3).

The trenchduct interior 21 is completely covered, and when in use there is access to the interior of the trenchduct by means of removable cover plates 30 which are strategically located throughout the network and are themselves covered by carpeting 31, linoleum 31(a), or the like secured by border members 33 fitted by ribs which are pressed into channels 35. Each cover plate is secured by removable fastener screws 32 to a lid-supporting means 37 consisting of a Z-shaped cross section member 34 comprised of a transverse section 36 which extends over the envelope of the trenchduct interior 21 and has a second transverse section 39 extending away from the interior 21. Section 36 has threaded opening 38 so that fastener screws 32 can secure the cover plate 30 to the transverse section 36. A vertical shank section 43 abuts the outer surface of the side wall 14 (wall 16 at the opposite side of the trenchduct) and has welded connections 41 with plate 40 including upwardly projecting portion 42 (FIG. 4) which forms a pocket for an extrusion 44 (FIGS. 2 and 3) with a channel 35 having press fitted border members 33 and 33(a) which secure floor covering either in the form of tile 31(a) or carpet 31 over the cover plate 30. Details of this construction and that of FIG. 3 are illustrated in copending U.S. application Ser. No. 152,379, filed May 22, 1980, and Canadian application Ser. No. 352,079 filed May 16, 1980 both entitled "Improved Junction Box" and assigned to the same assignee as the present application.

At the bottom end of the Z-cross section shaped member 34 (FIGS. 7, 3) is a transverse portion 39 which includes a threaded opening 38 receiving a threaded bolt 58 (FIGS. 4 and 6) with a head 60 captured by a U-shaped cross section bracket 61 embracing the subsurface of the base 12 and overlying the head 60 of the bolt 58. The brackets 61 are welded to the base 12 and thereby prevent the lid-supporting means 37 from sliding in a longitudinal direction during shipment or installation. The bolt 58 is free to move rotatably, when a tool (not shown) is passed into the slotted end 64 of the bolt 58, causing the bolt 58 to rotate and thus raising or lowering transverse portion 39 and vertically positioning the lid-supporting means 37 and lid 30. In this manner, the lid 30 is caused to be at an adjusted vertical position flush or level with the remaining portions of the floor. Thus, the trenchduct 10 and the cover plate 30 are more effectively concealed. After adjustment, the region surrounding the trenchduct 10 is filled with concrete 66 (FIGS. 2, 3) which completes the construction of the floor, and embeds the trenchduct 10 at a subfloor level.

An alternate construction for the lid-supporting means is illustrated in FIG. 5. In this construction, the lid-supporting means consists of a bifurcated portion 70 made up of a vertical shank 72 and downwardly projecting section 74 welded at 78 to the shank 72. The two membered lid-supporting means make up a Z-shaped cross section. The purpose of the bifurcated member 72, 74 is to produce a receiving gap for the side wall 14 thus accurately locating the lid-supporting means, while still permitting the vertical adjustment movement which will bring the lid 30 into coplanar position with the remainder of the floor. In all other respects, the construction is essentially the same as in the embodiment of FIGS. 1–4 and 6–8. After vertical adjustment of the cover plate 30 and cover plate supporting means 39, by means of the rotatable bolts 58, concrete is poured around the outer region of the trenchduct 10 as in the previous embodiment and the trenchduct 10 is permanently fixed at its subfloor position and ready to receive the electric power service in the form of communication cables or wiring.

The design and material of the subfloor trenchduct 10 have resulted in an improvement in manufacturing time because of the simplification of the steps of fabrication, as well as adding additional strength to the trenchduct. The subfloor trenchduct of the present invention favorably exceeded the requirements of the Canadian Standards Association (C.S.A) and has been certified by that organization. The strength tests showed a cover plate deflection of 0.069 inch and a permanent deformation of only 0.002 inch.

OPERATION

In operation, the trenchducts 10 in the preliminary stages of floor construction, are suitably located in accordance with an electric distribution network. The distribution network takes into account placement and routing of communication cables, wiring, and service outlets which are required, and intended to be accessible after installation, but effectively concealed at the subfloor level.

The duct work consists of a base 12 which makes a "run" and there is attached to the base the side walls 14, 16 all of which are preassembled as galvanized steel members. The galvanized steel members are unsusceptible to deterioration by the alkaline concrete so that no protective covering is required or applied over their surfaces. Next, there are strategically located clips 61 having bolts 58 passed therethrough, and which are fixed at preferred locations along the length of the run and slipped over the bottom surface of the base 12 with the bolts in an upright position. There is next installed over the bolts, and in registry with threaded openings which match with the bolts, the lid-supporting means 37, all portions of which are also constructed of galvanized steel and of relatively thin cross section so as to occupy as little space as possible between the side walls of the duct to ensure maximum utilization of the envelope of the duct for the communication and electrical service wiring. The trenchduct section is then enabled to receive installation of the communication cables, wiring, etc. The lids 30 are then fastened to the lid-supporting means. Thereafter, the vertical positions of the lids 30 are adjustably positioned by turning slotted ends 64 of bolts 58 in one direction or another and accurately locating the vertical position of the lid supporting means 37 and thus the associated lid 30.

After such accurate adjusted placement of the lid, concrete 66 is poured around the external surface of the trenchduct 10 and the trenchduct 10 becomes a permanent installation at the subfloor of the building construction.

Tile 31(a) and/or carpet 31 is then installed and covers the lid 30 and a combination trim and fastener is next installed in the manner described in copending U.S. application Ser. No. 152,379 and Canadian application Ser. No. 352,079. The members forming the duct are corrosion-free; the galvanized steel is uneffected by the alkaline content of the concrete.

INDUSTRIAL APPLICABILITY

The invention is especially adapted for commercial construction in distribution of electric power service and communication lines in accordance with a pre-planned service network.

CONCLUSION

Although the present invention has been illustrated and described in connection with example embodiments, it will be understood that this is illustrative of the invention, and it is by no means restrictive thereof. It is reasonably to be expected that those skilled in the art can make numerous revisions and additions to the invention and it is intended that such revisions and additions will be included within the scope of the following claims as equivalents of the invention.

We claim:

1. A trenchduct for interally receiving electric wires and cables, comprising an uncoated galvanized steel base, means forming uncoated galvanized steel side walls along opposite flanges of said base and secured to said flanges to define an open space for receiving electric service therebetween, threaded means operative secured to said flanges, vertically adjustable uncoated galvanized steel lid-support side wall means slideably engagable with said side walls and operatively defined in a lateral position relatively to said side walls, said lid-support side wall means comprising Z-cross section members each having a vertical section with a continuous flat surface flush with a respective side wall for slideable engagement therebetween, a downwardly extending continuous interior section spaced from said flat surface so that said flat surface and interior section are proportioned to receive therebetween the upper end of a respective side wall, a second section of each Z-cross section member projecting laterally above the confines of the open space formed by said side walls and base to receive the wires and cables, a third section of each Z-cross section member comprising a continuous transverse flange disposed outside the confines of said trenchduct and extending away from the respective side wall and having threaded openings therein, and a vertical abutment portion of said Z-cross section member extending vertically upward above the section of said lid-support side wall means projecting laterally above said open space to form a lid receiving pocket therewith, said threaded means threadedly received through threaded openings in a respective transverse flange to effect vertically adjustable movement of said lid-support side wall means, and removable lids disposed over the open end of said trenchduct at floor level and carried by the section of said lid-support side wall means projecting laterally above said trenchduct cavity, each of said Z-cross section members forming a continuous barrier enclosing the separation between the respective side wall and the removable lids and thereby preventing a concrete pour from entering said open space.

2. A trenchduct for internally receiving electric wires and cables comprising an uncoated galvanized steel base, means forming uncoated galvanized steel side walls along opposite flanges of said base and secured to said flanges to define an open space for receiving electric service therebetween, threaded means operatively secured to said flanges, vertically adjustable uncoated galvanized steel lid-support side wall means slideably engageable with said side walls and operatively defined in a lateral position relatively to said side walls, said lid-support side wall means comprising integral Z-cross section members each having a vertical section with a continuous flat surface substantially flush with a respective side wall for slideable engagement therebetween, a second section of each Z-cross section member projecting laterally above the confines of the open space formed by said side walls and base to receive the wires and cables, a third section of each Z-cross section member comprising a continuous transverse flange disposed outside the confines of said trenchduct and extending away from the respective side wall and including threaded openings therein, and a continuous plate of uncoated galvanized steel welded to said vertical section to form a lid receiving pocket therewith, said threaded means threadedly received through threaded openings in a respective transverse flange to effect vertically adjustable movement of said lid-support side wall means, and a plurality of removable lids disposed over the open end of said trenchduct at floor level and carried by the section of said lid carrying side wall means projecting laterally above said trenchduct open space, each of said Z-cross section members forming a continuous barrier enclosing the separation between the respective side wall and removable lids and thereby preventing concrete pour from entering said open space.

3. The trenchduct construction in accordance with claim 2, further comprising a gasket and a header located between a respective lid and said second section.

4. The trenchduct construction in accordance with claim 2, further comprising means for attaching each of said lids to said second section.

5. The trenchduct construction in accordance with claim 2, further comprising clips embracing the outer perimetral edges of said flanges and each forming a pocket, a rotatable head of said threaded means received in each pocket and permitting rotation of said threaded means, a threaded stem of said threaded means received through a respective threaded opening in a transverse flange, and a slot at the upper end of each said threaded stem to facilitate tool-operated rotation of said stem whereby said lid-support side wall means is vertically adjustable relative to floor level before pouring concrete about the exterior of said trenchduct.

6. The trenchduct in accordance with claim 2, in which each part of said trenchduct is formed of galvanized steel and have minimal cross section dimensions to provide the maximum interior dimension for the open space and thereby maximize the disposal of electrical cable and distribution elements therein.

* * * * *